US008543002B1

(12) United States Patent
Mui

(10) Patent No.: US 8,543,002 B1
(45) Date of Patent: Sep. 24, 2013

(54) CONTROLLING TRANSMISSION POWER IN AN IRDA/RC TRANSMITTER CIRCUIT

(75) Inventor: Daniel SauFu Mui, San Jose, CA (US)

(73) Assignee: IXYS CH GmbH (CH)

(*) Notice: Subject to any disclaimer, the term of this patent is extended or adjusted under 35 U.S.C. 154(b) by 2085 days.

(21) Appl. No.: 11/437,884

(22) Filed: May 19, 2006

(51) Int. Cl.
*H04B 10/114* (2013.01)

(52) U.S. Cl.
USPC ............................................. 398/111

(58) Field of Classification Search
USPC .......................................... 398/106
See application file for complete search history.

(56) References Cited

U.S. PATENT DOCUMENTS

| 4,912,620 | A |   | 3/1990 | O'Dell | 363/20 |
| 5,652,561 | A |   | 7/1997 | Inoh et al. | 336/200 |
| 6,104,512 | A | * | 8/2000 | Batey et al. | 398/120 |
| 6,208,534 | B1 |   | 3/2001 | Shteynberg et al. | 363/21 |
| 6,606,174 | B1 | * | 8/2003 | Ishikawa et al. | 398/135 |
| 7,016,612 | B1 | * | 3/2006 | Ikeda et al. | 398/137 |
| 7,593,358 | B2 | * | 9/2009 | Inglese et al. | 370/310 |
| 2004/0213576 | A1 |   | 10/2004 | Tan et al. | 398/140 |
| 2005/0057169 | A1 | * | 3/2005 | Noguchi et al. | 315/150 |
| 2005/0185962 | A1 |   | 8/2005 | Grace | 398/135 |
| 2006/0018662 | A1 | * | 1/2006 | Grace | 398/135 |
| 2007/0052675 | A1 | * | 3/2007 | Chang | 345/158 |

FOREIGN PATENT DOCUMENTS

| EP | 1054423 A1 | 5/1999 |
| EP | 1345341 A2 | 11/2002 |
| JP | 60178735 | 2/1984 |

OTHER PUBLICATIONS

"TFDU6102, Fast Infrared Transceiver Module", Vishay, Nov. 2003.*
"Interfacing the Agilent HSDL-3002 for Remote Control Operation," Application Note 1314 by Agilent Technologies, Inc., Feb. 18, 2003, 16 pages. (ISBN: 5988-7936EN).
"Agilent IrDA Data Link Design Guide," by Agilent Technologies, Inc., Mar. 26, 2003, 67 pages.
"Agilent HSDL-3003 IrDA Data Compliant Low Power 115.2 kbit/s with Remote Control Infrared Transceiver," Data Sheet by Agilent Technologies, Inc., Jun. 11, 2003, 21 pages.
"Utilizing a Vishay IrDA Transceiver for Remote Control," Application Note by Vishay Semiconductors, Feb. 20, 2004, 14 pages.
Webpage entitled "Infrared transceivers—Vishay—Remote control applications" downloaded on Feb. 24, 2004 from www.vishay.com/ir-tranceivers/remote-list/, 5 pages.

* cited by examiner

*Primary Examiner* — Shi K Li
(74) *Attorney, Agent, or Firm* — Imperium Patent Works; T. Lester Wallace; Darien K. Wallace

(57) ABSTRACT

An infrared LED of an IrDA transceiver module is usable to transmit IrDA signals as well as RC control signals. When making an IrDA transmission, the IrDA LED is driven with a lower amount of current. When making an RC transmission, the IrDA LED is driven with an increased amount of current such that infrared emissions received by an RC receiver are of adequate power to be received as RC control signals. A current-limiting circuit allows more LED current to flow the longer current is allowed to flow through the IrDA LED. By controlling the durations of infrared bursts in the RC transmission, the average LED current during infrared bursts of RC transmissions is controlled. Using this technique allows the IrDA module to be used to transmit RC signals at different transmission power settings. To reduce power consumption, the minimum transmission power necessary to engage in RC communications is used.

29 Claims, 6 Drawing Sheets

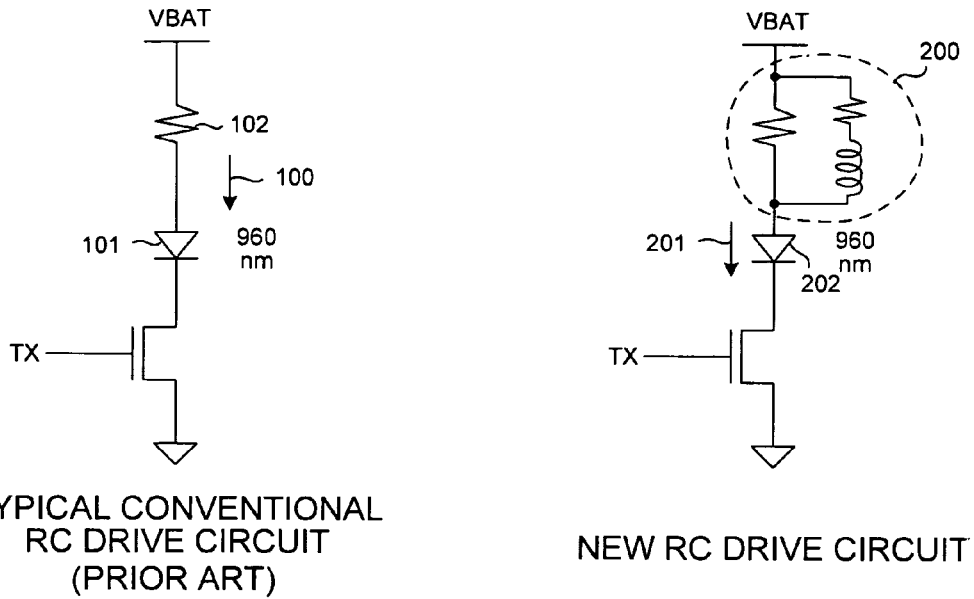
TYPICAL CONVENTIONAL
RC DRIVE CIRCUIT
(PRIOR ART)
FIG. 9
NEW RC DRIVE CIRCUIT
FIG. 10
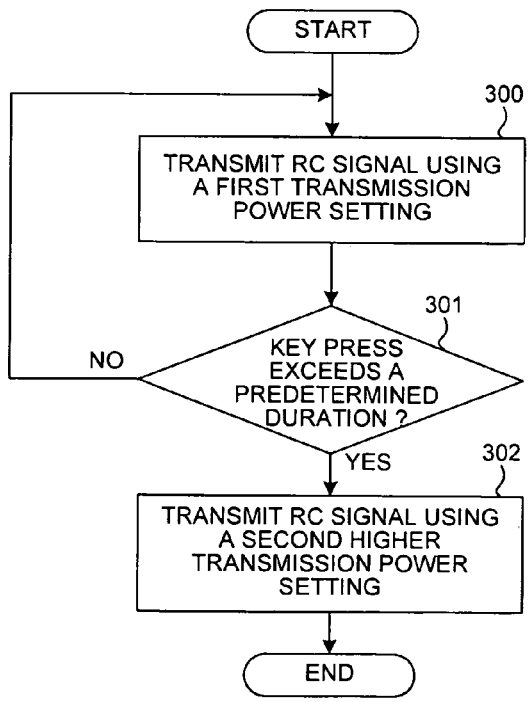
FIG. 11

CONTROLLING TRANSMISSION POWER IN AN IRDA/RC TRANSMITTER CIRCUIT

TECHNICAL FIELD

The present disclosure relates to controlling transmission power in infrared communications.

BACKGROUND INFORMATION

Portable electronic devices such as personal digital assistants (PDAs), cell phones, digital cameras, MP3 players, and laptop computers often use a type of infrared transceiver called an IrDA (Infrared Data Association) transceiver to transfer information. Each IrDA transceiver has an infrared light emitting diode (LED) that emits infrared radiation having a center wavelength somewhere in the range of from 850 nm to 900 nm (for example, 875 nm). Each IrDA transceiver also has an IR receiver (for example, a PIN diode) for receiving infrared signals of this wavelength. If, for example, each of two such portable electronic devices has an IrDA transceiver, then one device can transmit data to the other device across an IrDA link using infrared signals that comply with an IrDA standard. IrDA is, for example, often employed to communicate files of digital information between portable devices having such IrDA transceivers.

Electronic consumer devices in the home such as televisions, VCRs, DVD players, DVRs, CD players, stereo equipment, home theatre equipment, and so forth are typically controlled by remote control (RC) devices that also transmit infrared signals. These ordinary infrared signals, referred to here as "RC" (or remote control) infrared signals, typically have a center wavelength somewhere in the range of from 900 nm to 950 nm (for example, 940 nm). To turn the power on to a television, for example, a user may press a power key on a remote control device. The remote control device has an infrared LED that emits an RC infrared signal to the television. An infrared RC receiver circuit in the television receives the RC infrared signal, decodes the signal, and responds by turning the television on.

It has been recognized that it would be desirable to be able to use a portable electronic device to control an electronic consumer device that is designed to respond to RC infrared signals. If, for example, a user had a cellular telephone in his/her hand, then the user could use the cellular telephone to control a television.

It has been recognized that an IrDA transmitter LED within an IrDA transceiver module can be used as an infrared transmitter both for IrDA and RC applications. Although the peak wavelength of the transmitter LED in the IrDA transceiver is at a wavelength that is different from the wavelength of peak sensitivity of the RC infrared receiver in the electronic consumer device, some radiation transmitted by the infrared transmitter is nevertheless received by the RC receiver. The IrDA transmitter transmits energy in a band and the RC receiver receives energy in a band. The two bands overlap. Due to the mismatch of the center transmitter and receiver wavelengths, however, it may be necessary for the IrDA transmitter LED power to be increased in order for enough energy to be received at the RC receiver for the communication to work properly. An application note from Vishay Semiconductors (Vishay Semiconductor Application Note entitled "Utilizing a Vishay IrDA Transceiver for Remote Control", document number 82606, 14 pages, Feb. 20, 2004) discloses reducing the value of a current-limiting resistor so as to increase IrDA LED transmitter peak current and thereby to increase emission intensity of the IrDA LED transmitter.

Improvements and enhancements to a system employing an IrDA transceiver to transmit infrared signals to an RC receiver are sought.

SUMMARY

The same infrared light emitting diode (LED) of an (Infrared Data Association) IrDA transceiver module is usable both to transmit IrDA communication signals as well as to transmit infrared signals that are usable as remote control (RC) signals to control an electronic consumer device. When making an IrDA transmission, the IrDA LED is driven with a lower amount of current appropriate for IrDA communication. When making an RC transmission, the IrDA LED is driven with an increased amount of current such that infrared emissions received by an RC receiver within the electronic consumer device are of adequate power to be received as RC signals. A current-limiting circuit allows more LED current to flow the longer current is allowed to flow through the IrDA LED. By controlling the durations of infrared bursts in the RC transmission, the average LED current during infrared bursts of the RC transmission is controlled. Longer infrared bursts have larger average LED currents. Shorter infrared bursts have smaller average LED currents. Using this technique of controlling the durations of infrared bursts to control transmission power allows the IrDA module to be used to transmit RC signals at different power settings. RC signals having a higher power setting involve infrared bursts of longer duration. RC signals having a lower power setting involve infrared bursts of shorter duration. To reduce power consumption in the RC mode, the transmission power setting of the minimum transmission power necessary to engage in RC communications is used.

In one novel aspect, a portable electronic device (for example, a cell phone, a PDA, an MP3 player, a digital camera, or a laptop computer) includes the IrDA transceiver module and the current-limiting circuit described above. The IrDA LED of the IrDA transceiver module within the portable electronic device is usable to transmit RC signals to an electronic consumer device (for example, a television) of a user, but the user does not have codeset information for generating appropriate RC control signals for the particular electronic consumer device. The user therefore takes the portable electronic device to a location that dispenses RC codeset information. The location may, for example, be an electronic store that disseminates RC codeset information. The IrDA transceiver module of the portable electronic device is then used to engage in IrDA communications to download RC codeset information from another IrDA device maintained by the store. The RC codeset information is codeset information for controlling the user's electronic consumer device. Once the RC codeset information has been downloaded into the portable electronic device, the user takes the portable electronic device home and uses the IrDA LED of the transceiver in the portable electronic device in combination with the current-limiting circuit to transmit RC signals (such an RC signal is sometimes referred to as an "RC operational signal") from the portable device to the electronic consumer device. The RC signals are generated using the downloaded RC codeset information and therefore are usable to control the electronic consumer device. The transmission power of the RC signals is selected or adjusted or controlled as described above by selecting, adjusting or controlling the durations of the infrared bursts within the RC signals. Where, for example, the remote control device involves a microcontroller that drives a digital control signal TX to the IrDA transceiver module top turn off and on a switch within the IrDA module, the microcontroller sets the durations of the pulses (pulse widths) of the control signal TX so that the resulting RC signal that is transmitted from the IrDA transceiver module is of the appropriate power setting. By changing the power setting of the RC transmissions, the transmission range of the remote control device can be changed. By maintaining the power setting of the RC transmissions at as low a setting as is necessary for proper communication, power consumption of the remote control device is reduced.

Other embodiments and advantages and considerations and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 (Prior Art) is a diagram of a conventional LED drive circuit that is part of an ordinary held-held RC remote control device of the type used to control consumer electronic appliances in the home.

FIG. 10 is a diagram of a current-limiting circuit in an RC remote control device in accordance with a second novel aspect.

FIG. 11 is a flowchart of a method in accordance with another novel aspect.

DETAILED DESCRIPTION

Reference will now be made in detail to some embodiments of the invention, examples of which are illustrated in the accompanying drawings.

Figure 1:
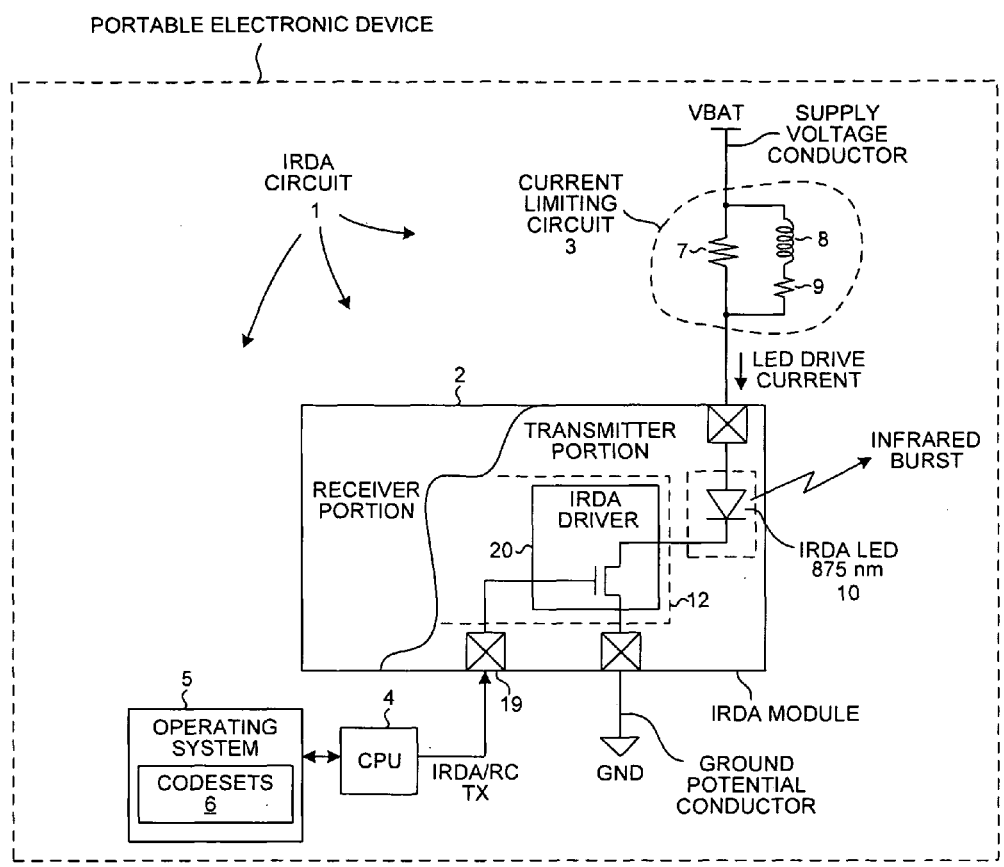
FIG. 1 is a diagram of an IrDA (Infrared Data Association) circuit 1 within a portable electronic device in accordance with one novel aspect. The duration of an infrared burst determines the average LED drive current during the burst, and therefore also determines the average transmission power during the burst.

FIG. 1 is a diagram of an IrDA (Infrared Data Association) circuit 1 within a portable electronic device in accordance with one novel aspect. Circuit 1 includes an IrDA transceiver module 2, a passive LED drive current-limiting circuit 3, a central processing unit (CPU) 4, and an operating system 5. The operating system has access to IR remote control (RC) codeset information 6. IrDA transceiver module 2 is disposed on a printed circuit board. In the present example, the portable electronic device of which the IrDA transceiver module 2 is a part is a personal digital assistant (PDA) and the printed circuit board is the printed circuit board of the PDA. Passive LED drive current-limiting circuit 3 includes a first resistor 7 that is coupled in parallel with a series combination of an inductor 8 and a second resistor 9. First resistor 7, inductor 8, and second resistor 9 are all discrete components disposed on the printed circuit board.

Figure 2:
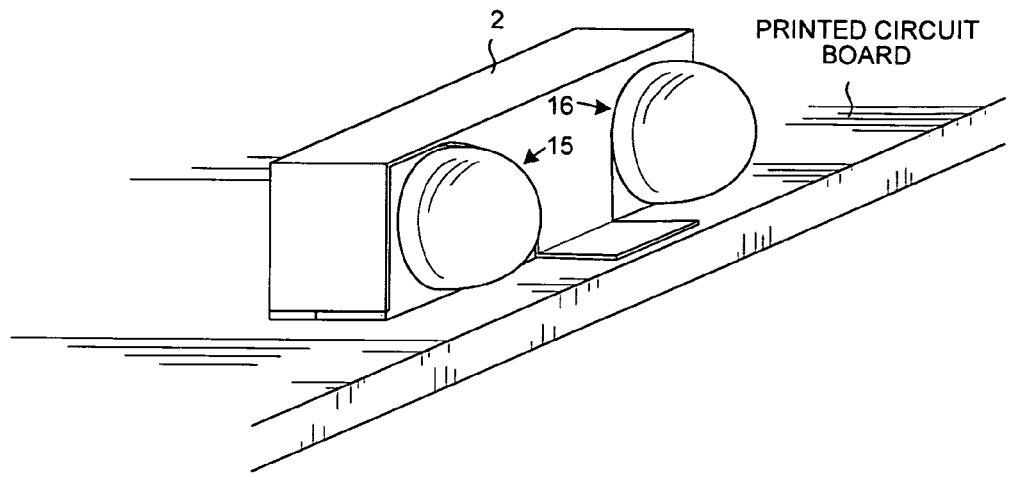
FIG. 2 is a perspective view of the IrDA transceiver module in circuit 1 of FIG. 1.
Figure 3:
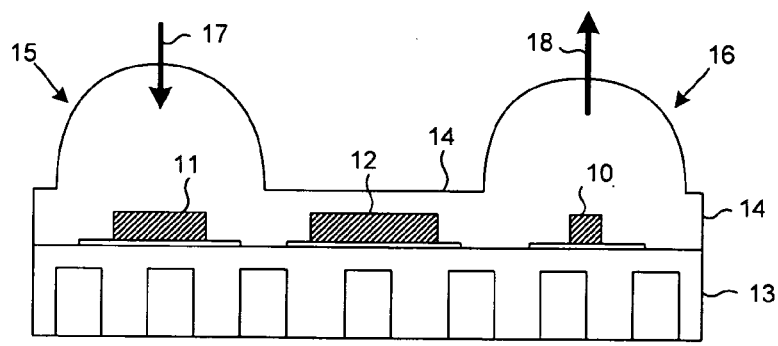
FIG. 3 is cross-sectional side view of the IrDA transceiver module of FIG. 2.
Figure 4:
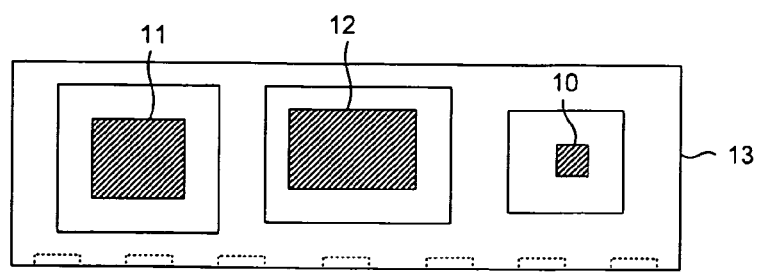
FIG. 4 is a cross-sectional top-down view of the IrDA transceiver module of FIG. 2.

FIG. 2 is a perspective view of IrDA transceiver module 2. FIG. 3 is a cross-sectional side view of IrDA transceiver module 2 of FIG. 2. FIG. 4 is a top-down view of a cross-section of IrDA transceiver module 2 of FIG. 1. IrDA transceiver module 2 may be an IrDA module of conventional construction such as an IrDA module available from Zilog, Inc. of San Jose, Calif. The IrDA module 2 includes three dice: 1) an IR transmitter diode die 10, 2) an IR receiver PIN diode die 11, and 3) a controller die 12. The three dice are mounted on a very small printed circuit board 13. Molded plastic 14 covers the printed circuit board and die assembly and forms two semi-spherical lenses 15 and 16. Lens 15 is the receiver lens that focuses incoming IR radiation 17 onto the PIN receiver diode 11 with the module. Lens 16 redirects the radiation emitted from IR transmitter LED die 10 into a beam 18.

Returning to FIG. 1, when an IrDA transmission is to occur, the 875 nm transmitter LED 10 is controlled in the conventional IrDA manner. In one example, an IrDA TX signal is supplied to the IrDA module via an IrDA/RC TX terminal 19 on the IrDA module, and an IrDA driver switch portion 20 of controller die 12 switches current through LED 10 in conventional fashion. IrDA driver switch portion 20 in this example is a field effect transistor. The amount of LED drive current initially when current starts to flow through LED 10 is limited primarily by the first resistor 7 in the left leg of the current-limiting circuit. The resistance of first resistor 7 is approximately one ohm. The IrDA TX signal stops drawing current through LED 10 before significant current begins to flow through inductor 8 in the right leg of the current-limiting circuit. The average LED drive current is therefore approximately 265 mA (over one IR burst duration), and the resulting intensity of radiation emitted from IrDA module 2 is approximately 40 mW/sr at 875 nm.

When a remote control (RC) transmission is to occur, however, a digital RC control signal TX is generated by software executing on the CPU 4 using the codeset information 6. For additional detail on codesets, on how codesets can be stored, and on an exemplary way to generate an RC transmission from codeset information, see: U.S. patent application Ser. No. 10/777,023, filed Feb. 10, 2004, now U.S. Pat. No. 7,259,696; and U.S. Pat. No. 7,339,513, filed Aug. 27, 2004 (the entire subject matter of these two documents is incorporated herein by reference). No microcontroller that stores codeset information need be provided where the IrDA circuit 1 is part of a personal digital assistant (PDA). Rather, codeset information 6 is stored in main memory on the PDA such that software executing on the CPU 4 of the PDA can access the codeset information and use it to drive the IrDA/RC TX terminal 19 with the RC TX signal. This RC TX signal is provided to IrDA module 2 via the same IrDA/RC TX terminal 19 that is used to supply the IrDA TX signal. Although an RC infrared signal is to be transmitted, transmitter LED 10 has a transmission peak at 875 nm. An IR remote control receiver (not shown) on an electronic consumer device (not shown) that is to be controlled by the RC transmission has a peak spectral sensitivity at a wavelength of approximately 940 nm. It is recognized that most IR remote control receivers in electronic consumer devices will work satisfactorily if they receive 40 mW/steradian at 940 nm.

Figure 5:
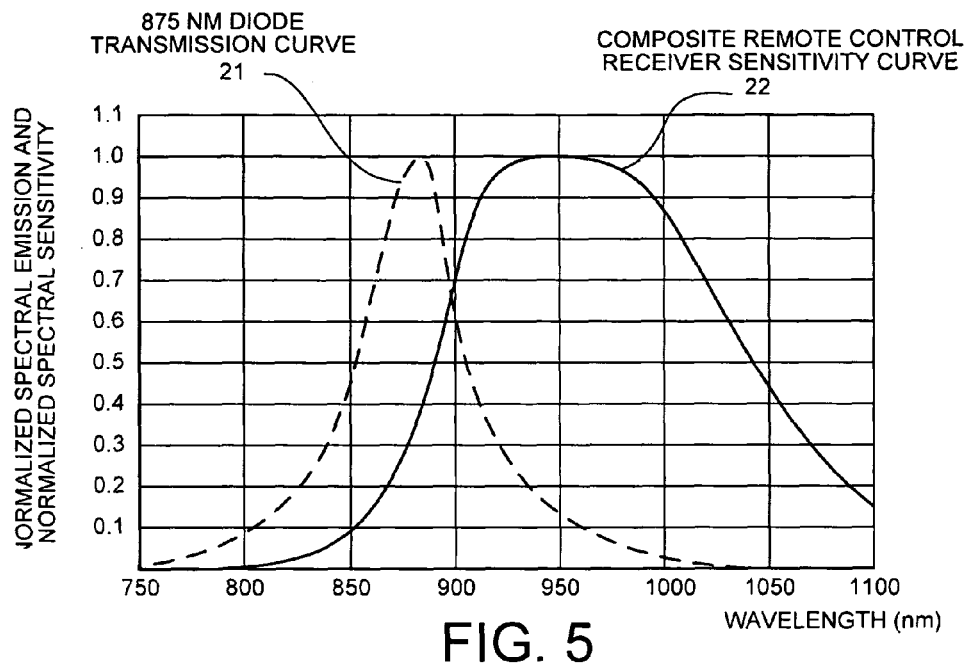
FIG. 5 is a graph that shows a spectral emission distribution curve of an infrared LED within an IrDA transceiver module as well as a composite spectral sensitivity curve for numerous typical IR remote control (RC) receivers.

FIG. 5 is a graph that shows the spectral emission distribution curve 21 of 875 nm IrDA transmitting LED 10 as well as a composite spectral sensitivity curve 22 for numerous typical IR remote control (RC) receivers. Note that the amount of radiation emitted from the 875 nm transmitting diode 10 drops from its normalized high at 875 as wavelength increases to the right of its peak. The amount of radiation emitted is down to sixty percent of its normalized high at 900 nm. Also note that the spectral sensitivity of the composite IR remote control (RC) receiver curve is at its normalized high at 940 nm, but that it is down to seventy percent of its high at 900 nm to the left of its peak. The curve 21 of the IrDA transmitter LED overlaps the response curve 22 of the RC receiver.

Although IrDA uses an infrared signal of approximately 870 nm and RC remote control devices use an infrared signal of approximately 960 nm, the IrDA transmitter LED within module 2 actually emits radiation over a range of wavelengths. By increasing the transmission power of the IrDA LED 10, the amount of energy transmitted at 960 nm can be made sufficiently large that the IrDA transmitter LED is usable to make RC transmissions to an RC receiver. See United States Publication 2005/0185962, published Aug. 25, 2005, and United States Publication 2006/0018662, published Jan. 26, 2006 (the entire subject matter of these two publications is incorporated herein by reference).

Figure 6:
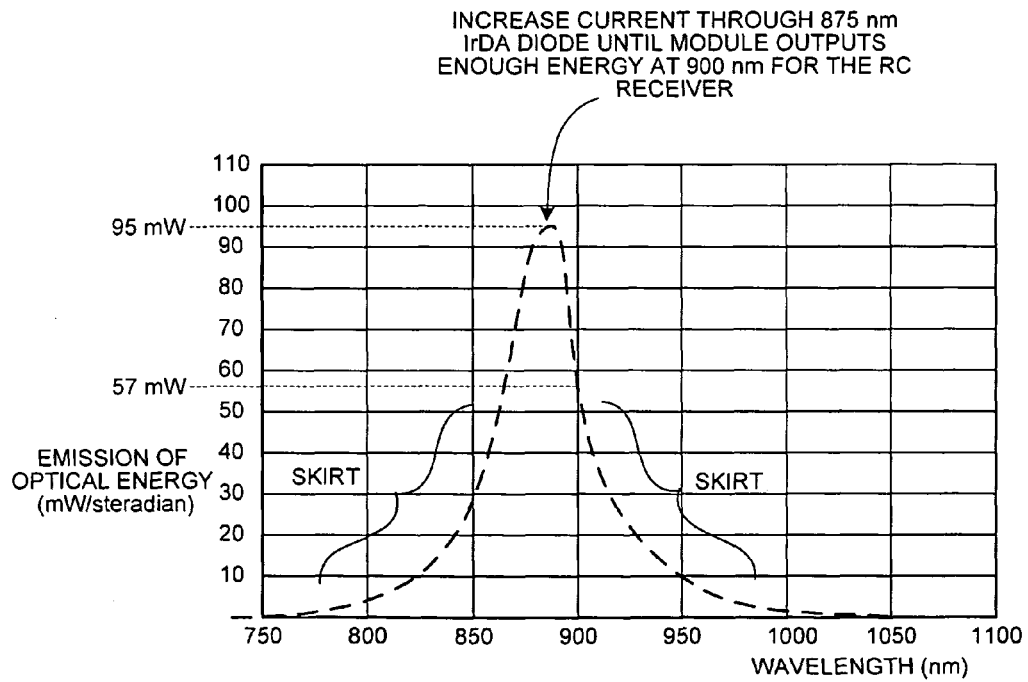
FIG. 6 is a diagram that shows how increased current flow through infrared LED of an IrDA transceiver module will cause the LED to output enough energy at 900 nm for RC receiver operation.

FIG. 6 is a diagram that shows how increased current flow through the IrDA 875 nm transmitter diode 10 in the RC transmitter mode will cause IrDA module 2 to output enough energy at 900 nm for RC receiver operation.

The circuit of FIG. 1 works by taking advantage of the fact that RC signals are transmitted with longer bursts of IR energy (approximately 10 microseconds) whereas the IrDA signals are transmitted with shorter bursts of IR energy (approximately 1.6 microseconds). During a short IrDA burst, inductor 8 of the passive LED drive current-limiting circuit 3 of FIG. 1 is not conducting a significant amount of current. Current flow through the passive LED drive current-limiting circuit 3 is limited primarily by the current-limiting first resistor 7 in the left leg of the current-limiting circuit 3. The value of the first resistor 7 is selected to limit the current flow into the LED 10 to a relatively low current level suitable for the IrDA transmission.

During a relatively longer RC burst, inductor 8 of the current-limiting circuit 3 of FIG. 1 conducts larger and larger amounts of current. If the magnetic field were to build up in inductor 8 until the core of inductor 8 were to saturate, then current flow through the current-limiting circuit 3 would level off at a current determined by the equivalent parallel resistance of first resistor 7 and second resistor 9 in the right leg of the current-limiting circuit 3. This peak amount of current would be the current flow into the LED 10 during the RC transmission.

Figure 7:
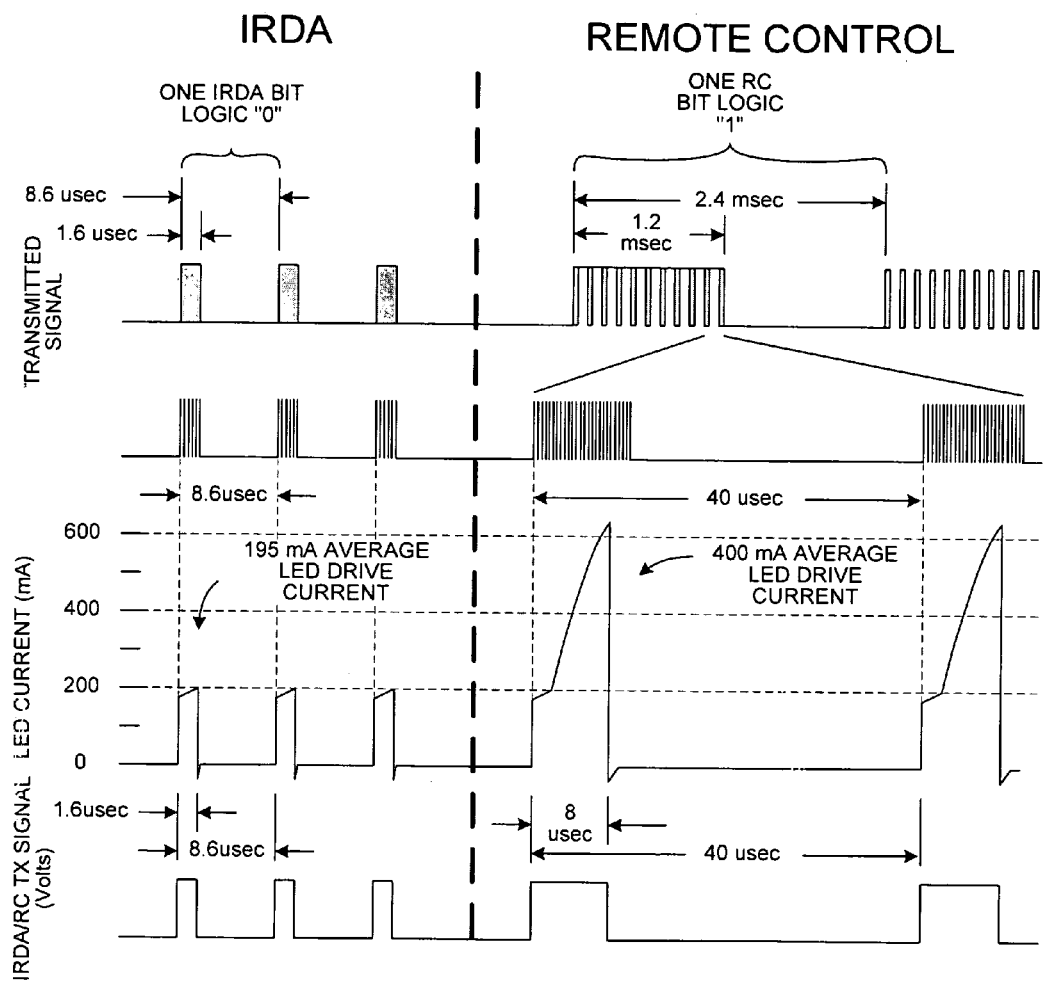
FIG. 7 shows waveforms of signals that can be output from the IrDA transceiver module of FIG. 1.

In accordance with one novel aspect, an amount of IR energy transmitted by LED 10 per RC infrared burst is selected, adjusted and/or controlled by CPU 4 of the PDA. FIG. 7 is a diagram that shows waveforms of signals in accordance this novel aspect. In the IrDA mode (illustrated in the portions of the waveforms on the left side of the page), the IR burst duration is so short that inductor 8 in the right leg of the current-limiting circuit 3 (see FIG. 1) has not begun to conduct significant current by the time the end of the burst occurs. Current flow through LED 10 is therefore limited by the first resistor 7 in the left leg of the current-limiting circuit as set forth above in connection with FIG. 1. The IrDA transmission is not modulated with a sub-carrier. The average current that flows into and through LED 10 is approximately 195 mA average during an IR burst duration in the IrDA mode. The current flows from the supply voltage conductor, through current-limiting circuit 3, through LED 10, through the switch in IrDA driver 20, and to a ground potential conductor.

RC mode operation is illustrated in the portion of the waveforms on the right side of FIG. 7. The 1.2 millisecond mark times of the RC signal illustrated in the upper waveform are modulated with a sub-carrier (sometimes referred to as the "carrier"). The second row of waveforms shows this modulation of the RC signal in greater detail. Individual bursts of IR are approximately 8 microseconds long. There are 32 microseconds between successive bursts. Due to the longer duration of an IR burst in the RC mode (in the illustrated example, eight microseconds), the inductor 8 begins to conduct current during a burst period. LED drive current rapidly rises until the end of the IR burst as illustrated. Inductor 8 is not yet saturated at the time that the IR burst ends in the RC example at the right of FIG. 7. Accordingly, the LED current of the waveform second from the bottom continues to rise through the duration of the IR burst. The average LED current is approximately 400 mA during an IR burst in the RC example at the right of FIG. 7.

Figure 8:
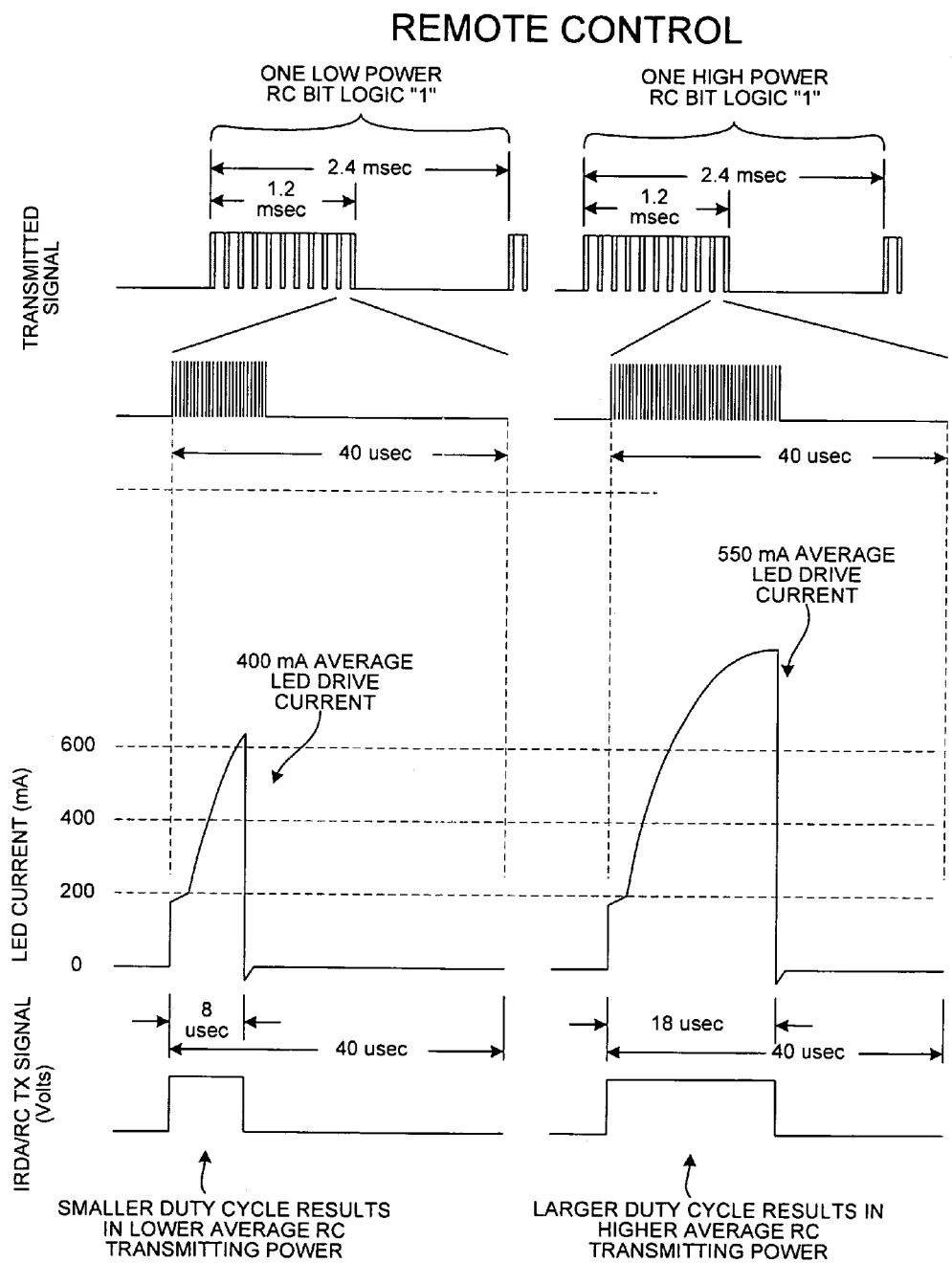
FIG. 8 is a waveform diagram that illustrates how the average LED drive current through the infrared LED of the IrDA transceiver module of FIG. 1 can be controlled in the RC mode to change the average LED drive current flowing through the LED during an infrared burst during generation of an RC control signal. The smaller average LED drive current on the left side of FIG. 8 represents a lower transmission power setting. The higher average LED drive current on the right side of FIG. 8 represents a higher transmission power setting.

FIG. 8 illustrates how the average LED drive current through LED 10 during an IR burst is set, controlled and/or controlled in the RC mode in the novel aspect. The average current flowing into LED 10 is increased by increasing the duty cycle of the RC sub-carrier. This is done by increasing the duty cycle of the controlling TX signal on IrDA/RC TX terminal 19. The resulting IR burst on the left side of the diagram of FIG. 8 is the same eight microsecond burst illustrated in FIG. 7. It was generated by a TX control signal of a duty cycle of 8 to 32, where the period of the sub-carrier is the 40 microseconds. The average LED drive current is 400 mA during the burst time.

The burst on the right side of FIG. 8 is, however, generated by a TX control signal of a duty cycle of 18 to 22, where the period of the sub-carrier is the same 40 microseconds. Rather than stopping the IR burst at the time when the current flowing through the current-limiting circuit 3 has risen to 600 mA as in the burst on the left side of the diagram of FIG. 8, the IR burst is extended such that the LED drive current flowing through the current-limiting circuit 3 continues to rise. The duration of the IR burst in the example on the right side of FIG. 8 is 18 microseconds. The average LED drive current is 550 mA during the burst. It is therefore seen that increasing the duty cycle of the TX control signal results in a higher average LED drive current flowing through LED 10 during a burst time. It also results in a higher average LED drive current flowing through the LED 10 when the entire mark time is considered.

Changing the duty cycle of the sub-carrier of the TX control signal during the RC mode does not generally disrupt receipt of the RC signal by typical receivers in typical electronic consumer devices. RC receivers are generally tuned to the frequency of the sub-carrier, not to the duty cycle of sub-carrier. Note that in both the low average transmission power situation at the left of FIG. 8 and in the high average transmission power situation at the right of FIG. 8, that the period of the sub-carrier is the same 40 microseconds.

The use of current-limiting circuit 3 involving inductor 8 and the changing of the duty cycle of the sub carrier to increase RC LED drive current during IR bursts is not limited to use with an IrDA transceiver module or with IrDA. FIG. 9 (Prior Art) is a diagram of a conventional 960 nm LED drive circuit that is part of an ordinary hand-held RC remote control device of the type used to control consumer electronic appliances in the home. The LED drive current 100 flowing through 960 nm LED 101 is fixed by the resistance of the current-limiting resistor 102.

FIG. 10 is a diagram of a current-limiting circuit 200 in an RC remote control device in accordance with a second novel aspect. Average LED drive current 201 flowing through a 960 nm LED 202 during an IR burst of an RC signal is controlled by controlling the duty cycle of the RC sub-carrier signal. IR bursts of longer duration have a higher average LED drive current. The microcontroller of the RC remote control device that typically drives the TX control signal to the LED 202 can, with minimal additional complexity, be made to set and/or change and/or control the duty cycle of the sub-carrier of the IR bursts in order to increase and/or decrease the average LED drive current 201 during a burst. The RC remote control device may, for example, have two or more different LED transmission power settings. When the first setting is used, the IR bursts are longer and are therefore of a higher first average transmission power. When the second setting is used, the IR bursts are shorter and are therefore of a lower second average transmission power. In one example, the remote control device of the second novel aspect of FIG. 10 is an RC remote control device that does not involve an IrDA transceiver module and that does not and cannot transmit IrDA communication signals.

In a first method, a low transmission power setting is attempted initially. The user of an RC remote control device may, for example, initiate this condition by putting the remote control device into a programming mode, and then pressing an appropriate key on the remote control and holding it down. A microcontroller of the remote control device then increases the transmission power setting step by step until the user notices that the RC communication link starts to operate in a satisfactory manner. The microcontroller does this by increasing the duty cycle of the sub-carrier of the RC signal. Once satisfactory RC communication is achieved, then the increasing of power setting is halted and higher transmission power settings are not attempted. The user may, for example, stop the power setting from increasing by releasing the key. In this way, if a higher average power transmission setting is not required, then the high transmission power setting is not used and power is saved by using the lowest power setting that functions acceptably.

In a second method, a high transmission power setting is used initially. The user of the RC remote control device can initiate this condition by putting the remote control device into a programming mode, and then pressing an appropriate key and holding it down. The microcontroller of the remote control device then reduces the transmission power setting step by step until the user notices that the RC communication link has stopped functioning satisfactorily. In one example, proper functioning can involve turning the electronic consumer device off and then back on. The microcontroller reduces the transmission power setting by reducing the duty cycle of the RC signal's sub-carrier. The user may indicate that the RC communication link has stopped functioning by releasing the key on the RC remote control device. Releasing the key causes the RC remote control device to increase its transmission power setting one increment and then to use this power setting for subsequent operation. Regardless of how the transmission power setting is set, the transmission power setting is selected to be the setting of the least transmission power that works satisfactorily. As compared with a conventional RC remote control device that has only one power setting and consequently may use more transmission power that is required in a given circumstance, the novel RC remote control device uses the smallest amount of LED drive current required that results in satisfactory communication between the RC remote control device and the electronic consumer device to be controlled. By reducing the amount of transmission power used, battery life of the remote control device is extended. This control of RC transmission power sees use in RC remote control devices that do not have an IrDA communication capability as well as in electronic devices that employ IrDA transceivers to transmit RC infrared signals.

In a third method, a remote control device uses a particular first transmission power setting (step 300). If the user presses a key on the remote for less than a predetermined normal duration, then the first transmission power setting is used for the duration of the key press. If, however, the user presses a key for more than the predetermined duration (step 301), then the microcontroller automatically increases the transmission power setting (step 302). The transmission power setting may, for example, be increased to the maximum transmission power setting for the entire remainder of the key press duration or for subsequent short time periodic intervals during the remainder of the key press duration. The feature of automatically increasing the transmission power setting during unusually long key presses may be usable to prevent users from becoming irritated with a remote control device whose power setting is so low that communication is sometimes marginally functional and sometimes, depending on the orientation of the remote control device and the electronic consumer device, is nonfunctional at the low power setting.

In an embodiment where the portable electronic device (for example, a cell phone, a PDA, an MP3 player, a digital camera, a laptop computer) includes an IrDA transceiver module that is usable to send RC control signals to an electronic consumer device, (for example, a television), the user may not have codeset information for generating control signals for the user's electronic consumer device. In one novel aspect, the user takes the portable electronic device to a location that dispenses codeset information. The location may, for example, be an electronic store that disseminates codeset information. The IrDA transceiver module of the portable electronic device is then used to download codeset information from another IrDA device maintained by the store. The codeset information is codeset information for controlling the user's electronic consumer device. The user may test usage of the RC codeset at the location. Once the codeset information has been downloaded into the portable electronic device, the user takes the portable electronic device home and uses the IrDA LED of the transceiver in the portable electronic device in combination with the current-limiting circuit described above to transmit RC control signals from the portable device to the electronic consumer device. The RC control signals are generated using the downloaded codeset information and therefore control the electronic consumer device.

In one embodiment, a microcontroller of a remote control device monitors the voltage level of the LED supply voltage. The LED supply voltage is usually a battery voltage VBAT and the remote control device is powered by the battery. Ordinarily, the transmission power of the LED of the remote control device would decrease with decreasing supply voltage. In this embodiment, however, the microcontroller detects the decreasing LED supply voltage, and increases the duty cycle of the carrier to compensate such that LED transmission power is higher than it otherwise would be. In one example, the compensation is adequate to maintain RC transmission power at a substantially constant level despite a decrease in LED supply voltage as the battery of the remote control device ages.

Although the present invention has been described in connection with certain specific embodiments for instructional purposes, the present invention is not limited thereto. A current-limiting circuit can be placed in the current supply path of another type of radiation emitting device (for example, an LED of a flashlight or light fixture or another type of light), and the burst duration can be controlled to increase or decrease the average drive current flowing through the emitting device during the on-time of the emitting device. The burst duration can be controlled by supplying a control signal onto a control terminal of a transistor that draws current through the emitting device. A microcontroller or other suitable signal generating device is usable to control and/or change the duty cycle of the control signal, thereby controlling and/or changing the duty cycle of the drive current flowing through the emitting device. Increasing the duty cycle increases the average drive current flowing through the emitting device. Decreasing the duty cycle decreases the average drive current flowing through the emitting device. The emitting device need not be a light transmitting device but rather can be a transmitter of another type of energy such as, for example, an RF transmitter. The technique of increasing transmitting power of an emitter typically used in a first communication band such that side skirt emissions of the emitter are of adequate power to be received as an intelligence signal in another communication band is not limited to using an IrDA LED to transmit RC control signals. The particular circuitry illustrated in FIG. 1 for the current-limiting circuit is only exemplary. The series resistance of the right leg need not be provided by a separate component but rather can be the series resistance of inductor 8. Other circuit configurations for accomplishing the function of the current-limiting circuit can be employed. A current-limiting circuit can involve a transistor or other mechanism for switching in different current limiting resistances. For example, the series resistance of the right leg of the current-limiting circuit 3 can have controlled resistance that is a function of the burst duration setting. The cost of providing a remote control device having multiple selectable transmission settings is low because the capability can be provided without the addition of a significant amount of complexity or expensive active circuitry. The feature can, for example, be provided by adding only a few discrete passive components (the passive current-limiting circuit 3 of FIG. 1) and by programming the microcontroller or CPU of the remote control device to change the pulse width of the digital RC control signals output to the infrared LED.

Accordingly, various modifications, adaptations, and combinations of various features of the described embodiments can be practiced without departing from the scope of the invention as set forth in the claims.

What is claimed is:

1. An apparatus, comprising:
   an infrared light emitting diode (LED) that emits a burst of infrared energy, wherein the burst is a part of an infrared remote control (RC) signal for controlling an electronic consumer device;
   a passive current-limiting circuit that limits an LED drive current flowing through the infrared LED to a first average current value if the burst is of a longer first duration, wherein the passive current-limiting circuit limits the LED drive current flowing to a second average current value if the burst is of a shorter second duration; and
   a control circuit adapted to select how long the LED drive current flows through the infrared LED such that the burst changes from having the longer first duration to having the shorter second duration, wherein the second average current value of the LED drive current is sufficient to communicate the RC signal from a remote control device to the electronic consumer device.

2. The apparatus of claim 1, wherein the apparatus is a remote control (RC) device that has at least two LED transmission power settings, wherein the RC remote control device has a first LED transmission power setting if the burst has the longer first duration and a second LED transmission power setting if the burst has the shorter second duration, wherein the burst is a burst within one sub-carrier period of a mark time of the RC signal, and wherein there are multiple other sub-carrier periods in the mark time.

3. The apparatus of claim 2, further comprising:
   a switch that is conductive during each burst within the mark time and that is nonconductive when the LED is not emitting a burst within the mark time, wherein when the switch is conductive a current flows from a supply voltage conductor, through the passive current-limiting circuit, through the infrared LED, and through the switch to a ground potential conductor.

4. The apparatus of claim 1, wherein the infrared LED is a part of an IrDA transceiver module, and wherein the control circuit is a digital processor within a portable electronic device, the portable electronic device being taken from the group consisting of: a personal digital assistant (PDA), a cellular telephone, a digital camera, an MP3 player, and a laptop computer.

5. The apparatus of claim 1, wherein the burst is one of a plurality of bursts that are emitted during a mark time of the RC signal, wherein the mark time is modulated onto a sub-carrier signal, wherein the sub-carrier signal has cycles, and wherein the cycles of the sub-carrier signal have a period that does not change as the mark time of the RC signal is increased by emitting additional bursts.

6. The apparatus of claim 1, wherein the apparatus is an RC remote control device that has multiple selectable IR transmission power settings.

7. The apparatus of claim 1, wherein the control circuit is adapted to respond to user input and in response to the user input to change an IR transmission power setting of the apparatus.

8. The apparatus of claim 1, wherein the burst has an end, wherein the passive current limiting circuit includes an inductor, wherein the LED drive current flows through the inductor during the longer first duration, and wherein the inductor does not saturate by the end of the longer first duration.

9. An apparatus, comprising:
   an infrared light emitting diode (LED) that emits a burst of infrared energy, wherein the burst is a part of an infrared remote control (RC) signal for controlling an electronic consumer device;
   a passive current-limiting circuit that limits an LED drive current flowing through the infrared LED to a first average current value if the infrared burst is of a longer first duration, whereas the passive current-limiting circuit limits the LED drive current flowing to a second average current value if the infrared burst is of a shorter second duration;
   a control circuit, wherein the burst has a duration, wherein the control circuit sets the duration of the burst to be a selectable one of the longer first duration and the shorter second duration, wherein the apparatus is a remote control (RC) device that has at least two LED transmission power settings, wherein the RC remote control device has a first LED transmission power setting if the burst has the longer first duration and a second LED transmission power setting if the burst has the shorter second duration, wherein the burst is a burst within one sub-carrier period of a mark time of the RC signal, and wherein there are multiple other sub-carrier periods in the mark time; and a switch that is conductive during each burst within the mark time and that is nonconductive when the LED is not emitting a burst within the mark time, wherein when the switch is conductive a current flows from a supply voltage conductor, through the passive current-limiting circuit, through the infrared LED, and through the switch to a ground potential conductor, wherein the control circuit supplies a control signal onto the control terminal of the switch, wherein the control signal has a duty cycle, and wherein the control circuit changes the duty cycle of the control signal such that an LED transmission power setting is changed from one of the first and second LED transmission power settings to the other of the first and second LED transmission power settings.

10. An apparatus, comprising:
an infrared light emitting diode (LED) that emits a burst of infrared energy, wherein the burst is a part of an infrared remote control (RC) signal for controlling an electronic consumer device;
a passive current-limiting circuit that limits an LED drive current flowing through the infrared LED to a first average current value if the infrared burst is of a longer first duration, whereas the passive current-limiting circuit limits the LED drive current flowing to a second average current value if the infrared burst is of a shorter second duration; and
a control circuit, wherein the burst has a duration, wherein the control circuit sets the duration of the burst to be a selectable one of the longer first duration and the shorter second duration, wherein the infrared LED is a part of handheld remote control (RC) device, and wherein the handheld remote control device does not have an IrDA communication capability.

11. A method, comprising:
(a) using an IrDA transceiver module to emit bursts of infrared energy in a selectable one of a plurality of transmission power settings, wherein the bursts are parts of an infrared remote control (RC) signal generated when an LED drive current flows through an inductor and an infrared light emitting diode (LED); and
(b) limiting the LED drive current and thereby changing the selected transmission power setting from a higher power setting to a lower power setting, wherein both the higher power setting and the lower power setting are sufficient to communicate the RC signal from a remote control device to an electronic consumer device.

12. The method of claim 11, wherein the IrDA transceiver module receives a control signal having a duty cycle, wherein the LED drive current is limited in (b) by changing the duty cycle of the control signal, and wherein the inductor does not saturate when the LED drive current flows through the inductor when the higher power setting is selected.

13. The method of claim 11, wherein the IrDA transceiver module receives a control signal having a plurality of pulses, wherein each pulse of the plurality of pulses has a pulse width, wherein the transmission power setting is changed by changing the pulse width of the plurality of pulses of the control signal, and wherein the inductor does not saturate when the LED drive current flows through the inductor when the higher power setting is selected.

14. The method of claim 11, further comprising:
(c) using the IrDA transceiver module to emit an IrDA communication signal.

15. The method of claim 11, wherein the IrDA transceiver module is part of a portable electronic device, and wherein the changing in (b) is initiated by a user of the portable electronic device.

16. The method of claim 11, wherein the IrDA transceiver module is part of a portable electronic device, the portable electronic device being used by a user, and wherein the power transmission setting is user-selectable.

17. The method of claim 11, wherein the IrDA transceiver module includes a single infrared LED, wherein the single infrared LED is used both to emit the bursts of infrared energy of the infrared remote control (RC) signal of (a) as well as to emit bursts of infrared energy of an IrDA communication signal, and wherein the inductor does not saturate when the bursts of infrared energy of the infrared RC signal are emitted.

18. The method of claim 11, wherein the selected transmission power setting is changed in (b) to a minimum transmission power setting necessary to engage in RC communications with an electronic consumer device at a transmission range of the electronic consumer device.

19. The method of claim 11, further comprising:
(c) using the IrDA transceiver module to receive an IrDA communication signal that includes RC codeset information, wherein the RC codeset information is included in the infrared RC signal.

20. The method of claim 11, wherein the bursts are emitted during a mark time of the infrared RC signal, wherein the mark time is modulated onto a sub-carrier signal, wherein the sub-carrier signal has cycles, and wherein the cycles of the sub-carrier signal have a period that does not change as the mark time of the infrared RC signal is increased by emitting additional bursts.

21. A circuit comprising:
an IrDA transceiver module having an infrared light emitting diode (LED), the infrared LED emitting bursts of infrared energy, wherein the bursts are parts of an infrared remote control (RC) signal; and
means for changing a transmission power setting of the infrared RC signal from a higher power setting to a lower power setting, wherein both the higher power setting and the lower power setting are sufficient to communicate the RC signal from a remote control device to an electronic consumer device, and wherein the means is also for limiting an LED drive current that flows through an inductor and the infrared LED.

22. The circuit of claim 21, wherein a user of the circuit can change the transmission power setting of the infrared RC signal.

23. The circuit of claim 21, wherein the means limits an LED drive current flowing through the infrared LED to a first average current value if the infrared bursts are of a longer first duration, and wherein the means limits the LED drive current flowing through the infrared LED to a second average current value if the infrared bursts are of a shorter second duration.

24. A circuit comprising:
an IrDA transceiver that includes an infrared light emitting diode (LED), the LED having a first terminal and a second terminal;
a switch having a first terminal, a second terminal, and a control terminal, wherein the first terminal is coupled to the second terminal of the LED, wherein the second terminal is coupled to a ground conductor;

a current-limiting circuit having a first terminal and a second terminal, the second terminal being coupled to the first terminal of the LED, the first terminal being coupled to a supply voltage conductor; and means for supplying a control signal onto the control terminal of the switch such that a plurality of pulses of current flows through the LED, wherein the plurality of pulses results in the LED emitting a corresponding plurality of bursts of infrared energy, wherein the bursts of infrared energy are parts of an infrared remote control (RC) signal, wherein the means is also for changing a pulse duration of the pulses such that a transmission power of the bursts of infrared energy is changed from a higher power to a lower power, and wherein both the higher power and the lower power are sufficient to communicate the RC signal from a remote control device to an electronic consumer device.

25. The circuit of claim 24, wherein the current-limiting circuit includes a first resistor and an inductor, the first resistor having a first terminal that is coupled to the first terminal of the current-limiting circuit, the first resistor having a second terminal that is coupled to the second terminal of the current-limiting circuit, the inductor being electrically connected in parallel with the first resistor.

26. The circuit of claim 25, wherein the current-limiting circuit further includes a second resistor, the second resistor and the inductor forming a second leg of the current-limiting circuit, the first resistor being a first leg of the current-limiting circuit, wherein the first leg and the second leg are electrically connected in parallel with each other.

27. The circuit of claim 24, wherein the RC signal is transmitted from the circuit in an RC operating mode, and wherein the means is also for controlling the switch such that the circuit transmits an IrDA communication signal in an IrDA operating mode.

28. The circuit of claim 24, wherein some of the bursts of the infrared remote control (RC) signal have a first pulse duration and wherein after the means changes the transmission power others of the pulses have a second pulse duration.

29. The circuit of claim 24, wherein the remote control device is taken from the group consisting of: a personal digital assistant (PDA), a cell phone, an MP3 player, a digital camera and a laptop computer.

* * * * *